United States Patent
Shokhrin et al.

(10) Patent No.: US 9,591,000 B2
(45) Date of Patent: Mar. 7, 2017

(54) METHODS, SYSTEMS, AND COMPUTER READABLE MEDIA FOR AUTHORIZATION FRAMEWORKS FOR WEB-BASED APPLICATIONS

(71) Applicant: Oracle International Corporation, Redwood Shores, CA (US)

(72) Inventors: Anton Shokhrin, San Jose, CA (US); Kapono David Carter, San Jose, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 103 days.

(21) Appl. No.: 14/745,317

(22) Filed: Jun. 19, 2015

(65) Prior Publication Data
US 2016/0373455 A1 Dec. 22, 2016

(51) Int. Cl.
| | |
|---|---|
| *H04L 29/06* | (2006.01) |
| *H04L 12/24* | (2006.01) |
| *G06F 3/0482* | (2013.01) |
| *G06F 3/0484* | (2013.01) |
| *G06F 21/62* | (2013.01) |

(52) U.S. Cl.
CPC .......... *H04L 63/102* (2013.01); *G06F 3/0482* (2013.01); *G06F 3/04842* (2013.01); *G06F 21/629* (2013.01); *H04L 41/22* (2013.01)

(58) Field of Classification Search
CPC combination set(s) only.
See application file for complete search history.

(56) References Cited

U.S. PATENT DOCUMENTS

| | | | |
|---|---|---|---|
| 8,060,932 B2 | 11/2011 | Mohammed et al. | |
| 8,365,192 B2 * | 1/2013 | Holland | G06F 3/048 |
| | | | 719/313 |
| 8,701,163 B2 | 4/2014 | Hockings et al. | |
| 8,806,637 B2 | 8/2014 | Saldhana | |
| 2012/0030354 A1 * | 2/2012 | Razzaq | G06F 21/335 |
| | | | 709/225 |

(Continued)

OTHER PUBLICATIONS

"Apply fine-grained authorization to Java MVC apps," Axiomatics Webinar, http://www.slideshare.net/Axiomatics/apply-finegrained-authorization-to-java-mvc-applications, pp. 1-4 (Nov. 1, 2013).

(Continued)

*Primary Examiner* — Beemnet Dada
(74) *Attorney, Agent, or Firm* — Jenkins, Wilson, Taylor & Hunt, P.A.

(57) ABSTRACT

Methods, systems, and computer readable media for authorization frameworks for web-based applications. In one example, a server executes an application tier of an enterprise software application. The enterprise software application receives API calls from a user device. The user device presents a GUI for a presentation tier of the enterprise software application and sends API calls based on user interaction with the GUI. The sever executes an application tier security controller for checking the API calls against a mapping that maps each API call into a respective group with a respective user interface (UI) element of the GUI and a respective security key, and for controlling user access to the application tier based on checking the API calls against the mapping.

17 Claims, 5 Drawing Sheets

(56) References Cited

U.S. PATENT DOCUMENTS

| | | |
|---|---|---|
| 2013/0138721 A1 | 5/2013 | O'Connell et al. |
| 2014/0317691 A1 | 10/2014 | Zömbik et al. |
| 2015/0186664 A1* | 7/2015 | Nicolaou ............ G06F 21/6209 726/30 |
| 2016/0150028 A1* | 5/2016 | Klinger ................... H04L 67/16 709/217 |

OTHER PUBLICATIONS

Brossard, "Applying fine-grained access control in applications and APIs using Axiomatics Java PEP SDK," Axiomatics, Developer Blog, http://developers.axiomatics.com/blog/index/entry/applying-fine-grained-access-control-in-applications-and-apis-using-axiomatics-java-pep-sdk.html, pp. 1-4 (Oct. 31, 2013).

Hardt, "The OAuth 2.0 Authorization Framework," IETF, RFC 6749, http://tools.ietf.org/html/rfc6749, pp. 1-152 (Oct. 2012).

Andersen et al., "Securing Access to LightSwitch Applications," LightSwitch Security, MSDN Magazine, http://msdn.microsoft.com/en-us/magazine/hh456409.aspx, pp. 1-15 (Oct. 2011).

Microsoft Guide for Designing Application-Managed Authorization, Microsoft Support, http://support.microsoft.com/kb/829021, pp. 1-4, Revision: 2.4 (Apr. 19, 2007).

Bhatti et al., "A Policy-Based Authorization Framework for Web Services: Integrating X-GTRBAC and WS-Policy," IEEE, pp. 1-8 (2007).

E Advantage, "Authorization models for .NET applications can make systems easier to manage," TechRepublic, http://www.techrepublic.com/article/authorization-models-for-net-applications-can-make-systems-easier-to-manage/, pp. 1-6 (May 21, 2003).

Jacobs, "An Authorization Framework for Web-based Applications," MITRE Corporation, http://www9.org/w9-papers/EC-Security/153.pdf, pp. 1-14 (2000).

\* cited by examiner

METHODS, SYSTEMS, AND COMPUTER READABLE MEDIA FOR AUTHORIZATION FRAMEWORKS FOR WEB-BASED APPLICATIONS

TECHNICAL FIELD

This specification relates generally to an authorization framework for controlling data access and handling, e.g., for large, web-based enterprise grade applications where a high degree of control is desirable.

BACKGROUND

Enterprise software is software designed to satisfy the needs of an organization, e.g., a business, a school, or a government group. Enterprise software can provide business-oriented services such as automated billing, customer relationship management, enterprise resource planning, human resource management, and the like. Graphical User Interfaces (GUIs) for enterprise software are often built for the web using web-based applications, which can heighten the need to prevent unauthorized access and manipulation of data flowing through the web-based applications.

Some conventional web-based applications for enterprise software include a presentation tier and an application tier. The presentation tier is rendered within a web browser on a user device. The application tier is implemented on a server and executes a series of procedures, e.g., business logic, and returns data to the presentation tier for display in the web browser. The server can communicate with the user device using prearranged Application Programming Interfaces (APIs), e.g., Representation State Transfer (REST) based APIs.

Some enterprise software systems implement control for preventing unauthorized data access or modification exclusively at the presentation tier. With such an approach, the application tier may be vulnerable because rogue API requests (e.g., from $3^{rd}$ parties impersonating legitimate application users) can bypass the controls that are implemented at the presentation tier. Some other enterprise software systems provide imprecise, crude, and indiscriminate controls at the application tier in addition to the presentation tier. Accordingly, there exists a need for improved methods, systems, and computer readable media for authorization frameworks for web-based applications

SUMMARY

This specification describes application frameworks for web-based applications that can succeed in the context of large scale enterprise applications.

In some examples, a user device presents a GUI for a presentation tier of an enterprise software application in a web browser. The GUI includes UI elements for communicating with an application tier of the enterprise software application executing on a remote server using API calls. The user device executes a presentation tier security controller for receiving selected UI elements from the web browser in response to user actions. The user device checks the selected UI elements against a mapping that maps each UI element into a respective group with a respective API call and a respective security key. The user device control user access to the application tier based on checking the selected UI elements against the mapping.

In some examples, each security key specifies an authorization policy for both the UI element and the API call associated with the security key, and wherein checking the selected UI elements against the mapping comprises comparing a user role of an authenticated user with one or more authorized roles specified by the authorization policy. The GUI of the presentation tier includes a controlled group of UI elements specified in the mapping and an uncontrolled group of UI elements not specified in the mapping, and wherein the GUI of the presentation tier can bypass the presentation tier security controller in response to user actions associated with UI elements in the uncontrolled group. Executing the presentation tier security controller comprises receiving an instruction from an authorized user to add a first UI element from the uncontrolled group to the controlled group and, in response, creating a group for the first UI element in the mapping. Creating the group for the first UI element comprises associating a first API call and a first security key with the first UI element. Creating the group for the first UI element comprises creating the group without modifying software of the enterprise software application or without causing a system outage of the enterprise software application. Checking the selected UI elements against the mapping comprises checking the selected UI elements against individual attributes of input and/or output payloads of the API calls. Checking the selected UI elements against the mapping comprises checking for conditional or unconditional restrictions specified in the mapping. Checking the selected UI elements against the mapping comprises consulting an external data source when specified by the mapping to successfully evaluate a security policy of the enterprise software application. Presenting the GUI comprises rendering a first UI element based on a result of checking the first UI element against the mapping.

In some examples, a server executes an application tier of an enterprise software application. The enterprise software application receives API calls from a user device. The user device presents a GUI for a presentation tier of the enterprise software application and sends API calls based on user interaction with the GUI. The sever executes an application tier security controller for checking the API calls against a mapping that maps each API call into a respective group with a respective user interface (UI) element of the GUI and a respective security key, and for controlling user access to the application tier based on checking the API calls against the mapping.

In some examples, each security key specifies an authorization policy for both the UI element and the API call associated with the security key, and wherein checking the selected UI elements against the mapping comprises comparing a user role of an authenticated user with one or more authorized roles specified by the authorization policy. The GUI includes a controlled group of UI elements specified in the mapping and an uncontrolled group of UI elements not specified in the mapping. Executing the presentation tier security controller comprises receiving an instruction to add a first UI element from the uncontrolled group to the controlled group and, in response, creating a group for the first UI element in the mapping. Creating the group for the first UI element comprises associating a first API call and a first security key with the first UI element. Creating the group for the first UI element comprises creating the group without modifying software of the enterprise software application or without causing a system outage of the enterprise software application. Checking the selected UI elements against the mapping comprises checking the selected UI elements against individual attributes of input and/or output payloads of the API calls. Checking the selected UI elements against the mapping comprises checking for conditional or unconditional restrictions specified in the mapping. Checking the selected UI elements against the mapping comprises consulting an external data source when specified by the mapping to successfully evaluate a security policy of the enterprise software application. Executing the application tier security controller comprises storing, in a cache, an authorization policy, the mapping, and a plurality of keys specified in the mapping, and refreshing the cache in response to determining that the authorization policy or one of the keys has been changed.

The methods, systems, and computer readable media for the authorization framework can be useful, e.g., in affecting the operation of both client and server computing equipment. For example, by limiting the number of security elements that need to be stored and tracked, the authorization framework reduces the requirements for physical memory and computing resources on the client and sever computing equipment. Moreover, the authorization framework can enable improved security on the client and server devices themselves, which can prevent technical malfunctioning on those devices resulting from security breaches.

The subject matter described herein may be implemented in hardware, software, firmware, or any combination thereof. As such, the terms "function", "node" or "module" as used herein refer to hardware, software and/or firmware components for implementing the feature(s) being described. In some examples, the subject matter described herein may be implemented using a non-transitory computer readable medium having stored thereon computer executable instructions that when executed by the processor of a computer cause the computer to perform steps.

Computer readable media suitable for implementing the subject matter described herein include non-transitory computer-readable media, such as disk memory devices, chip memory devices, programmable logic devices, random access memory (RAM), read only memory (ROM), optical read/write memory, cache memory, magnetic read/write memory, flash memory, and application specific integrated circuits. In addition, a computer readable medium that implements the subject matter described herein may be located on a single device or computing platform or may be distributed across multiple devices or computing platforms.

DETAILED DESCRIPTION

Figure 1:
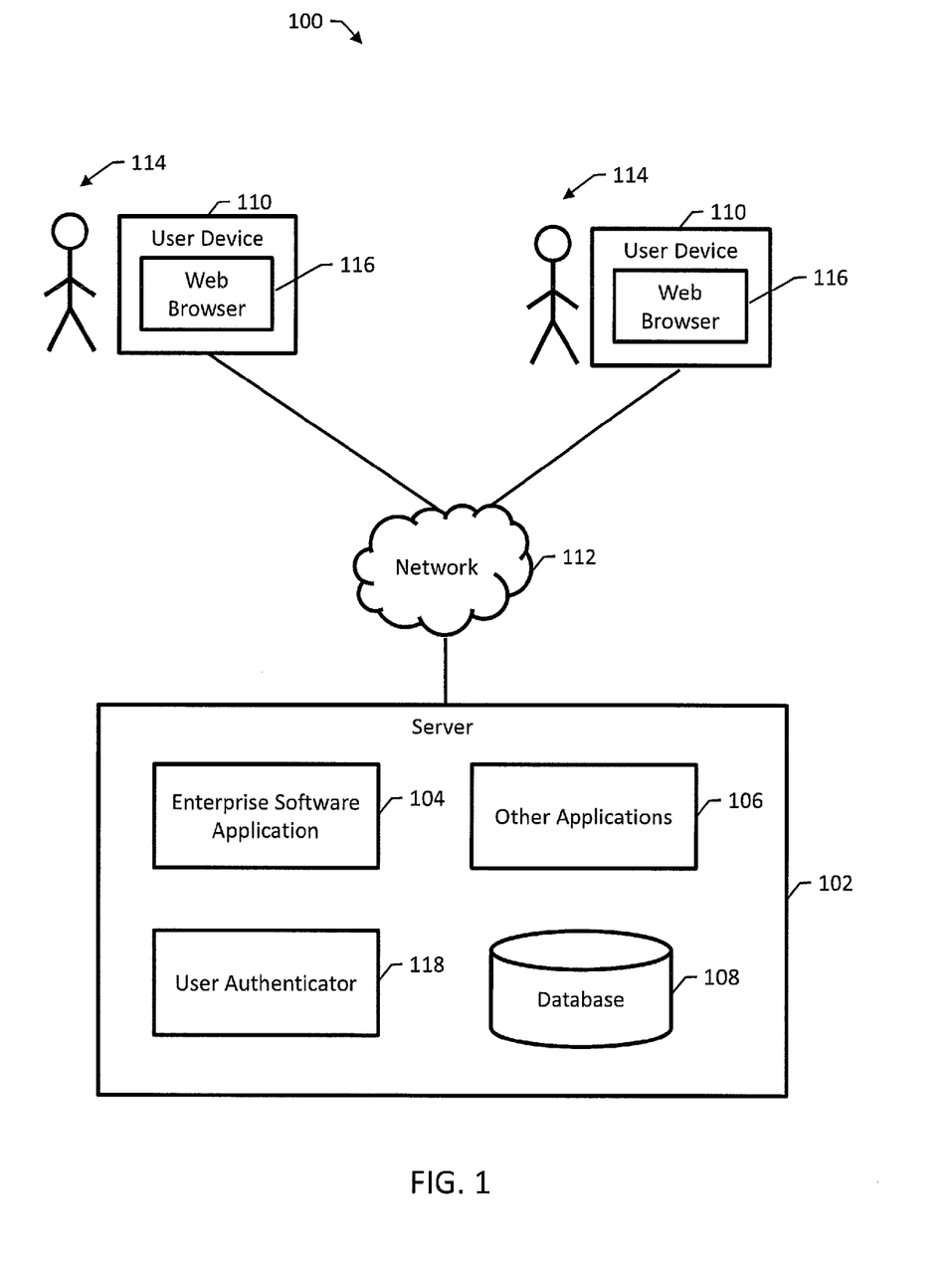
FIG. 1 is a block diagram of an example web-based enterprise application system.

FIG. 1 is a block diagram of an example web-based enterprise application system 100. The system 100 includes a server 102 executing an enterprise software application 104. The server 102 can be implemented as a system of one or more computers which can be located on-site for the enterprise, located remotely from the enterprise, or geographically distributed.

The enterprise software application 104 is stored on one or more computer readable media and includes instructions that, when executed by the server 102, causes the server 102 to provide services such as automated billing, customer relationship management, enterprise resource planning, human resource management, or other types of services. The server 102 can execute other applications 106 in addition to the enterprise software application 104. For example, the enterprise software application 104 can be a customer relationship management application, and the server 102 can independently execute a human resource management application in addition to the customer relationship management application.

The server 102 can include a database 108, e.g., a relational database that stores data to support the services provided by the enterprise software application 104 and any other applications 106. For example, the database 108 can store financial records, human resources records, customer relationship management data, or other types of services.

The system includes user devices 110 that communicate with the server 102 over a data communications network 112. The user devices 110 each include one or more computers, one or more computer readable mediums storing executable instructions for the computers, and input/output devices such as keyboards, display screens, touchpads, or other types of records or data. For example, the user devices 110 can be desktop computers or mobile phones. The data communications network 112 can be, e.g., a virtual private network (VPN) for the enterprise, the Internet, or a combination of computer networks.

Users 114 interact with the enterprise software application 104 using web browsers 116 executing on the user devices 106. A web browser is a software application for retrieving, presenting, and traversing information resources. The information resources can be stored on web servers and accessible over, e.g., the Internet, a corporate intranet, or other computer network.

Web browsers typically use the Hypertext Transfer Protocol (HTTP) to retrieve information from web servers. HTTP is an application protocol for distributed, collaborative, hypermedia information systems. Hypertext is structured text that uses logical links, e.g., hyperlinks, between nodes containing text and other multimedia. HTTP is the protocol to exchange or transfer hypertext.

The users 114 can launch the web browsers 116 on the user devices 110 and enter into the web browsers 116 a Uniform Resource Locator (URL) for the server 102. A URL is a reference to a resource that specifies the location of the resource on a computer network and a mechanism for retrieving it. The URL can be, e.g., a URL for an enterprise home page. From the enterprise home page, the users 114 can use the web browsers 116 to navigate to the enterprise software application 104.

The server 102 supplies web pages to the user devices 110 for presentation in the web browsers 116. The web pages can include Graphical User Interfaces (GUIs) for the users 114 to use to the services provided by enterprise software application 104. For example, the web pages can include Hypertext Markup Language (HTML) documents and associated image files.

HTML is the standard markup language used to create web pages. HTML can be written in the form of HTML elements that include tags, e.g., enclosed in angle brackets. The web browsers 116 can read HTML files and render them into visible web pages. The web browsers 116 use the HTML tags and scripts to interpret the content of the page, instead of rendering the tags themselves.

In some examples, other web technology can be used to implement the GUI for the enterprise software application 104. The enterprise software application 104 can implement any appropriate web technology. For example, the GUI can be created using asynchronous JavaScript and XML (AJAX). AJAX is a group of interrelated web development techniques, typically used at the user devices 110, to create asynchronous web applications. Using AJAX, the web browsers 116 can send data to and retrieve data from the server 102 asynchronously without interfering with the display and behavior of existing pages.

The web browsers 112 can use a document object model (DOM) for representing and interacting with objects in web pages. The DOM is a cross-platform and language-independent convention for representing and interacting with objects in HTML, XHTML, and XML documents. The nodes of the documents can be organized in a tree structure, the DOM tree, and objects in the DOM tree can be addressed and manipulated using methods on the objects. The DOM can have an application programming interface (API) that provides access to the DOM.

The enterprise software application 104 can be implemented in an application tier that executes on the server 102 and by a presentation tier that is presented by the web browsers 116 of the user devices 110. Using a presentation tier and an application tier can provide flexibility in using the system 100 but can also heighten the need to prevent unauthorized access and manipulation of data.

To prevent unauthorized access and manipulation of data flowing through the web-based applications, the system 100 can implement a security policy requiring authentication and authorization for user actions. The user devices 110 can communicate with the server 102 using a secure communications protocol, e.g., Hypertext Transfer Protocol (HTTP) on top of the Secure Socket Layer (SSL) protocol (HTTPS).

HTTPS can protect the privacy and integrity of exchanged data. HTTPS can provide bidirectional encryption of communications between a client and a server, which can protect against eavesdropping and tampering with communications between a client and a server.

The users 114 can authenticate to the server 102 and/or the enterprise software application 104 specifically using a user authenticator 118. The user authenticator 114 can be implemented as software stored on one or more computer readable mediums and executable by the server 102. The server 102 can provide a web page to the user devices 110 that contains text input fields for user credentials, e.g., user identifiers and passwords. The web browsers 116 display the web pages, the users 114 enter their credentials, and the web browsers 116 send the credentials to the user authenticator 118.

The user authenticator 118 checks the credentials against a repository of user credentials, which can be stored in the database 108. If the credentials match credentials stored in the repository, then the user authenticator 118 authenticates the user. For example, the user authenticator 118 can supply tokens to the user devices 110.

The user authenticator 118 can assign a role to the user based on the user credentials. The role can be, e.g., human resources user, marketing user, management user, system administrator, and so on. In some examples, the roles are organized using a Role Based Access Control (RBAC) model, which can be used to improve security control for access and authorization and to enforce access policies such as segregation of duties (SoD) to meet regulatory compliance.

RBAC is an approach to restricting system access to authorized users. RBAC can implement mandatory access control (MAC) or discretionary access control (DAC). Roles are created for various job functions, and the permissions to perform certain operations are assigned to specific roles.

After authenticating the users 114, the system 100 uses an authorization framework for identifying user privileges. For example, the system 100 can use the authorization framework so that users having a role of human resources user can access employee records and so that users having a role of marketing user can access customer relationship management records. The authorization framework can be implemented on both the user devices 110 and the server 102.

In some examples, one or more of the user devices 110 can communicate with the server 102 even when the network 112 is an unsecured network. The authorization framework can be used to improve security in scenarios involving the unsecured network. In some examples, the authorization framework can be used for applications other than enterprise software applications. For example, one or more users 114 using, e.g., smartphones or tablets, can access trouble tickets on the go with a dedicated smartphone application. In general, the authentication framework can be used with any application that has a presentation tier and an application tier that communicate over a network.

Figure 2:
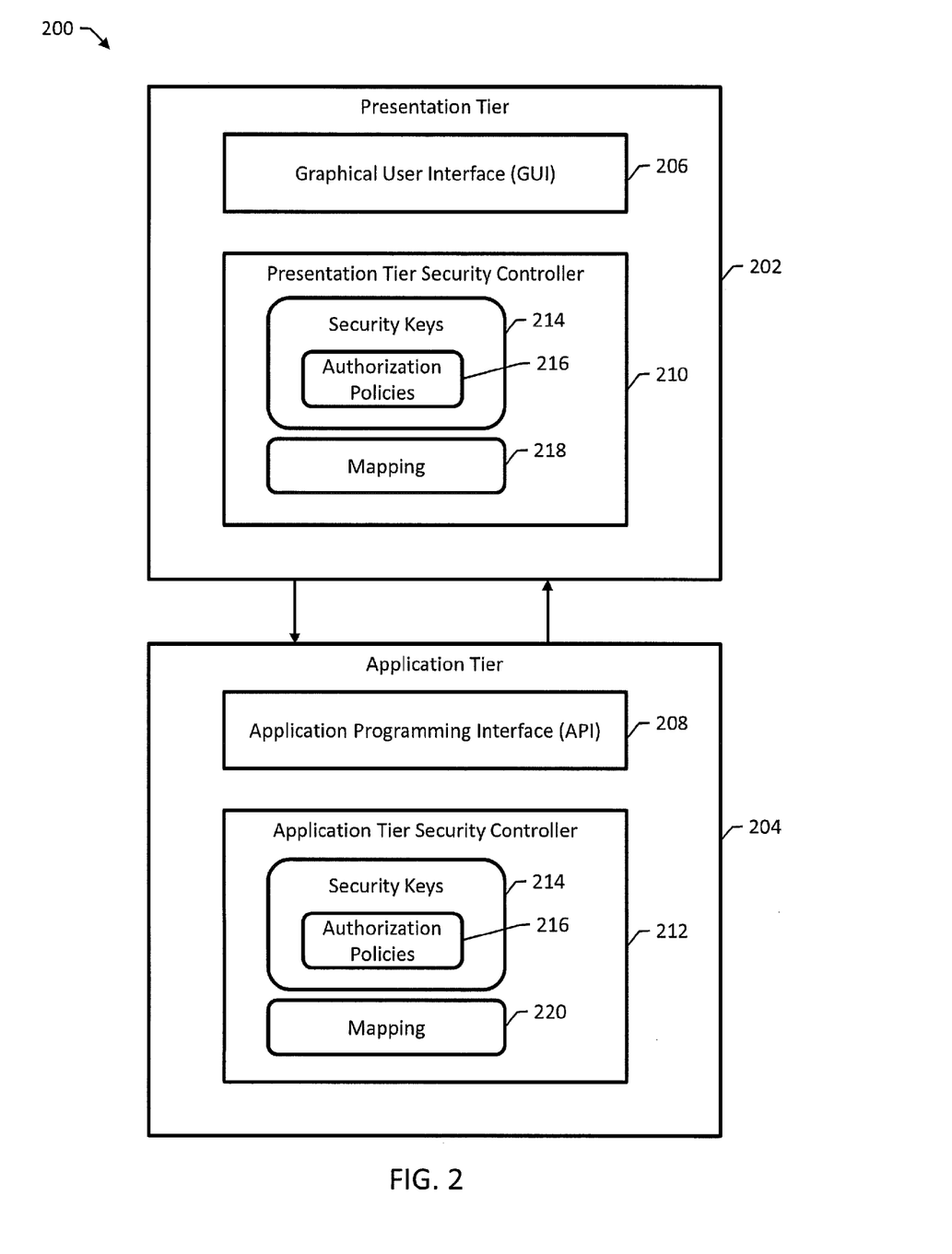
FIG. 2 is a block diagram of an authorization framework for a presentation tier and an application tier.

FIG. 2 is a block diagram of an example authorization framework 200 for a presentation tier 202 and an application tier 204 of an enterprise software application. The presentation tier 202 includes a Graphical User Interface (GUI) 206 that includes a number of User Interface (UI) elements, e.g., buttons, menus, and text input boxes. The GUI 206 can be implemented in one or more web pages or any appropriate data structure.

The application tier 204 includes an Application Programming Interface (API) 208 that is configured to receive API calls and respond to the API calls. The API 208 provides an interface for the presentation tier 202 to access the services of an enterprise software application. The presentation tier 202 can make calls to the API 208 and receive, in response, data based on the made API calls.

The API 208 can be a Representation State Transfer (REST) based API. REST is a software architectural style that includes guidelines and best practices for creating scalable web services. Some REST based APIs communicate over HTTP using HTTP verbs (e.g., GET, POST, PUT, DELETE, and so on) used by web browsers to retrieve web pages and send data to remote servers.

The API calls for the API 208 can have input/output payloads including one or more attributes. In some examples, the API 208 includes a large number of possible API calls, e.g., in the thousands, and each API call can have several input and output payloads.

Furthermore, the GUI 206 can include a large number of UI elements, e.g., in the thousands. To meet the need for user defined rules governing which elements of the input/output API payloads and API calls can be modified, viewed, updated, or masked, the framework 200 implements a presentation tier security controller 210 and an application tier security controller 212.

The framework 200 can improve an authorization rules configuration procedure for an enterprise software application by grouping UI elements and API calls associated with those UI elements and protecting the API calls with a single security key. Authorization logic can be defined in terms of the security keys 214 and enforced by both the presentation tier security controller 210 for UI elements and the application tier security controller 212 for API calls.

Defining the authorization logic this way can be useful, e.g., in reducing the overall number of elements to control, thereby reducing the probability of misconfiguration and degrading system performance compared to some systems where configuration of authorization logic for the presentation tier and the application tier are carried out as two independent tasks.

Each security key specifies one or more authorization policies 216 for both the UI element and the API call associated with the security key. The authorization policies can be specified, e.g., in terms of roles or user identifiers of authenticated users.

For example, prescribing read-only access for a particular security key is all that is required to instruct the presentation tier 202 to render a given UI element as read-only (e.g., greyed out) and for the application tier 204 to reject attempts at updating a corresponding field by an API call. The security key can specify that the given UI element and API call are read-only for certain users, roles, or classes of users or roles. For example, the security key can specify that the given UI element and API call are read-only for all roles except for management roles and system administrator roles.

The presentation tier security controller 210 stores a cached copy of the security keys 214 and authorization policies 216 and a mapping 218 between individual security keys and UI elements of the GUI 206. The cached copy is refreshed whenever a change is introduced, e.g., when an authenticated and authorized user makes a change to the security keys 214 or the authorization policies.

The presentation tier security controller 210 determines policies governing data access rules for an application user and interprets the policies whenever a situation calls for an authorization decision. The presentation tier security controller 210 can consult external data sources when appropriate to successfully evaluate the policy.

For example, suppose an authorization policy specifies that any authenticated user with a job title that includes "management" should have access to a certain UI element and corresponding API call. The presentation tier security controller 210 can supply a user identifier to a human resources system (e.g., another application executing on a server) to lookup the user's job title in the human resources system.

After receiving the user's job title, the presentation security controller 210 can determine whether the user's job title includes "management." If so, the presentation tier security controller 202 can render the UI element of the GUI 206 to indicate that the user can access the UI element and corresponding API call.

In another example, suppose an authorization policy specifies that an authenticated user in the sales department can read customer information but can only edit the customer information if the user is listed as handling the customer's account in a sales database. The presentation tier security controller 210 can supply a user identifier for the user to a sales system to determine whether or not the user is listed as handling the customer's account. If the user is not listed as handling the customer's account in the sales system, then the presentation tier security controller 210 can cause a UI element displaying the customer information to be rendered as read-only. if the user is listed as handling the customer's account in the sales system, then the presentation tier security controller 210 can cause the UI element displaying the customer information to be rendered as editable.

The presentation tier 202 can involve the presentation tier security controller 210, e.g., whenever the GUI 206 paints or updates itself in response to a user action. The presentation tier security controller 210 can also support one-off authorization requests. In some examples, the presentation tier security controller 210 checks selected UI elements against the mapping 218, e.g., by comparing a user role of an authenticated user with one or more authorized roles specified by an authorization policy.

In operation, the GUI 206 uses the presentation tier security controller 210 by supplying a list of UI elements to check for authorization, and the presentation tier security controller 210 responds using the mapping 218 and the authorization policy 214 with a list of UI elements and, for each element, a specification of an authorization to be performed. The GUI 206 can use the returned information to render and handle the UI elements accordingly. For example, the GUI 206 can render a UI element with read-only level of authorization as disabled, e.g., by greying the UI element.

The application tier security controller 212 also stores a cached copy of the security keys 214 and a mapping 220 between the security keys 214 and the API calls of the API 208 and the input/output payloads of the API calls. The cached copy is refreshed whenever a change is introduced, e.g., a change to the authorization policy 214 or the security keys 216. For example, a system administrator or a system security officer can introduce a change to the authorization policy 214 or the security keys 216, e.g., by authenticating to the enterprise software application as an administrator.

The application tier security controller 212 determines policies governing data access rules for an application user and interprets the policies whenever a situation calls for an authorization decision. Situations calling for an authorization decision can include situations where a user is requesting to view or edit sensitive information stored by the enterprise software application. Attempts to change the security policy 214 will generally call for an authorization decision by the enterprise software application.

The application tier security controller 212 can consult external data sources when appropriate to successfully evaluate the policy, e.g., to lookup a user's job title in a human resources system. The application tier 204 can involve the application tier security controller 212, e.g., whenever an API call is received or prior to returning a response to an API call. The application tier security controller 212 can also support one-off authorization requests.

In operation, the application tier security controller 212 receives an API call and an input/output payload for the API call. The application tier security controller 212 can respond with a deny or allow response to the API call. The framework 200 can define authorization logic in terms of flexible policies that can target individual attributes of input/output payloads of API calls. The application tier security controller 212 can check a role of an authenticated user against a list of authorized roles for API calls and input/output payloads for API calls.

If the API call is specified by a security key as requiring a payload level authorization, then the application tier security controller 212 can return a list of constraints for each element of the payload or a denial response.

For example, suppose that the application tier security controller 212 receives an API call from a user having a customer service role to retrieve a customer's name, phone number, and credit card number. The security key for the API call specifies that the authorization policy for customer service roles is to supply the customer's name and phone number and to apply a data mask to the customer's credit card number. The application tier security controller 212 can return an allow response for the customer's name and phone number and a data mask constraint for the credit card number.

In another example, suppose that the application tier security controller 212 receives an API call from a user having a customer service role to modify the user's outstanding balance. The security key for the API call specifies that the authorization policy for the customer service role is that the user's outstanding balance is read-only, and that only a user role from the billing department can modify the user's outstanding balance. The application tier security controller 212 can respond with a denial indicating the user is not authorized.

In some examples, the framework 200 can specify conditional restrictions for authorization. For example, suppose that the application tier security controller 212 receives an API call from a user having a customer service role to adjust a customer's balance.

The security key for the API call specifies that the authorization policy for the customer service role is to permit an adjustment to a balance by no more than $5. If the payload of the API call specifies the amount of the adjustment, the application tier security controller 212 can determine whether to allow or deny the request, or the application tier security controller 212 can return the condition to the application tier to evaluate the policy.

For another example, suppose that the application tier security controller 212 receives an API call from a user having a human resources role to adjust an employee's insurance information. The security key for the API call specifies that the authorization policy for the human resources role is to permit the adjustment if the adjustment is made during an open enrollment period or if there is a qualifying event. If the payload of the API call includes data specifying the qualifying event, the application tier security controller can determine whether to allow or deny the request, or the application tier security controller 212 can return the condition to the application to evaluate the policy.

In some examples, the framework 200 groups the UI elements and API calls into a controlled group and an uncontrolled group. UI elements and API calls in the controlled group are specified as security elements to be secured by the framework 200. For example, a software developer or system manager can specify which UI elements and API calls are in the controlled group and the uncontrolled group. The UI elements and API calls in the uncontrolled group can bypass the presentation tier security controller 210 and the application tier security controller 212.

The framework 200 can provide a mechanism to specify that a UI element or API call in the uncontrolled group is in the controlled group by an authorized person without coding, redeployments, or system outages. For example, the application tier 204 can provide one or more web pages to the presentation tier to be displayed to an authenticated and authorized system administrator.

The web pages can display visual representations of the security keys, authorization policies, and mappings, and provide UI elements to allow the system administrator to edit the visual representations. For example, the web pages can allow text entry of data specifying new policies and dragging-and-dropping of visual representations to modify existing policies.

Then, the presentation tier can notify the presentation tier security controller 210 and application tier security controller 212 of any edits. In response the presentation tier security controller 210 and the application tier security controller 212 can update the security keys, authorization policies, and mappings as appropriate.

UI elements that do not implicate sensitive information can be specified in the uncontrolled group to reduce the complexity and processing overhead of the authorization framework 200. Sensitive information can be, e.g., private customer data such as credit card numbers, balance information, or contact information.

For example, a UI element that simply changes a view may not implicate any sensitive information, so a system administrator can omit that UI element from the mappings and security keys. As another example, an API call requesting information that is publicly available, e.g., the price of an item for sale, may not implicate any sensitive information, so a system administrator can omit that API call from the mappings and security keys.

Figure 3:
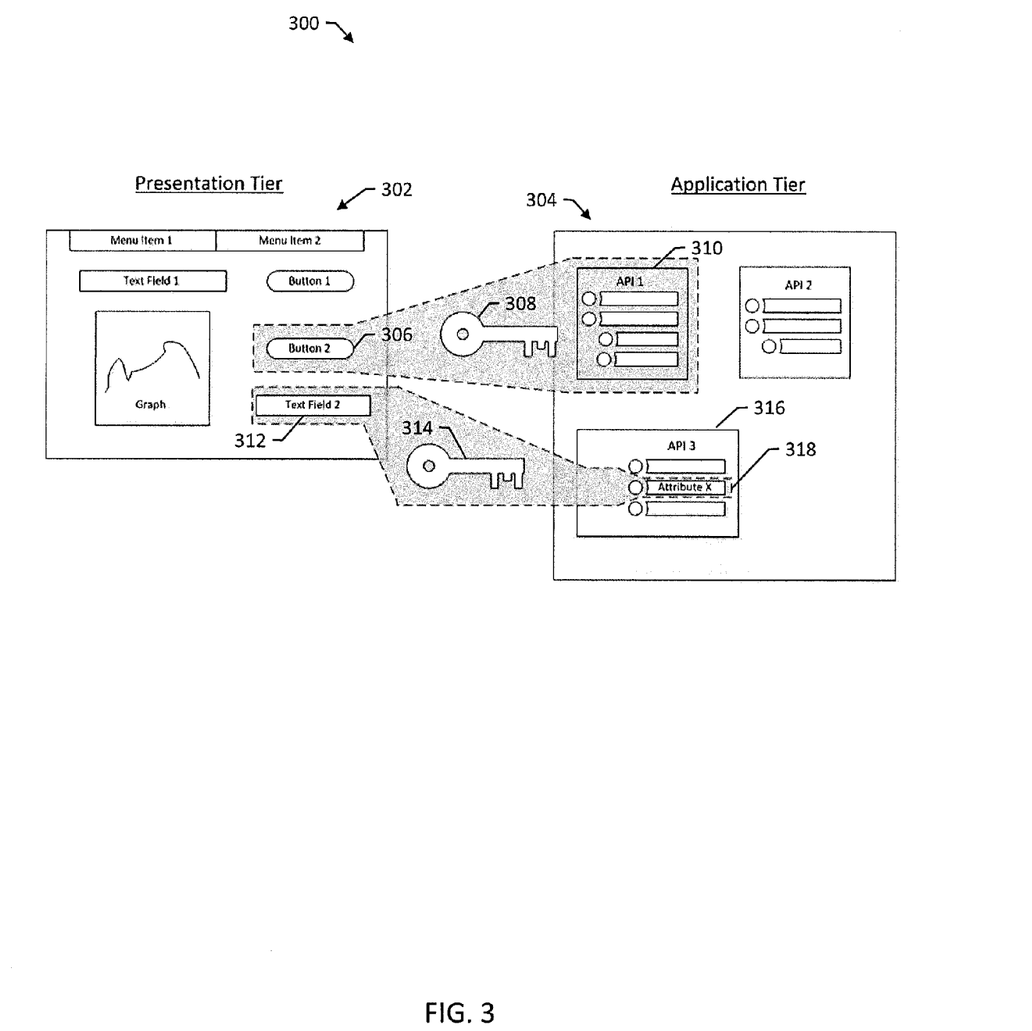
FIG. 3 is a conceptual diagram illustrating an example GUI and an example API.

FIG. 3 is a conceptual diagram illustrating an example GUI 302 and an example API 304. The GUI 302 includes a button 306 which is mapped to a first security key 308 and a first API call 310 of the API 304. The GUI 302 also includes a text field 312 which is mapped to a second security key 314 and an attribute 318 of the payload of a second API call 316.

The mapping 218 stored by the presentation tier security controller 210 stores an association between the button 306 and the first security key 308 and an association between the text field 312 and the second security key 314. The mapping 220 stored by the application tier security controller 212 stores an association between the first security key 308 and the first API call 310 and an association between the second security key 314 and the attribute 318 of the payload of the second API call 316.

The associations can be based on a unified object model implemented at the presentation and application tiers. In the unified object model, a UI element such as a text field is also an attribute of a payload, and a user action on a UI element such as a click of a button is also an API call. So a single security key and a single policy can be sufficient to define authorization behavior for both the presentation tier and the application tier.

For example, specifying a read-only access for a particular security key's authorization policy 214 can cause the presentation tier to render a given UI element as read-only and can cause the application tier to reject attempts at updating the contents of the UI element through API calls. In another example, specifying read and edit access for a particular security key's authorization policy 214 can cause the presentation tier to render a given UI element as editable and can cause the application tier to accept requests at updating the contents of the UI element through API calls.

Accordingly, the access and handling of secure information can always be performed as specified by the authorization policy 214 for the purposes of the enterprise. Attributes of the input/output payload of API calls, the API calls themselves, and UI elements can be protected by assignment of a security key and defining policy governing access. Moreover, the policy dictating the data access rules can be formulated with conditions referencing information found in the input/output payloads of API calls (e.g., "money transfer" operation is only authorized for amounts smaller than $10) or based on external properties (e.g., "query of address book" operation is only authorized from within an enterprise network).

Figure 4:
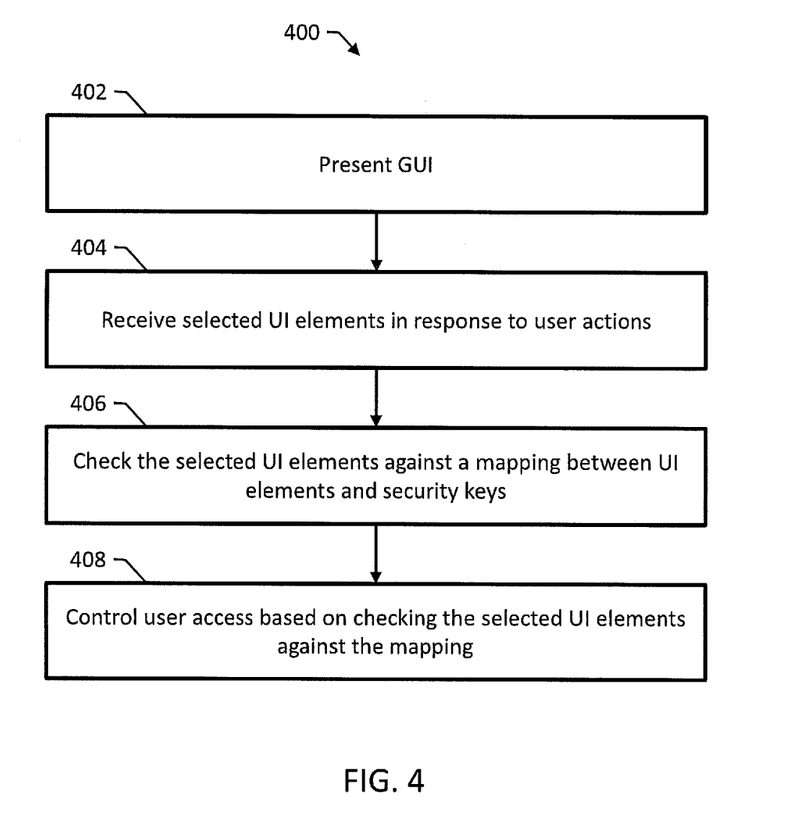
FIG. 4 is a flow diagram of an example method performed by a presentation tier security controller.

FIG. 4 is a flow diagram of an example method 400 performed by a user device, e.g., one of the user devices 106 of FIG. 2. One or more non-transitory computer readable mediums can store instructions that, when executed by a system of one or more computers, cause the system to perform the method 400.

The user device presents a GUI (402) including a number of UI elements for interacting with an enterprise software application. For example, the user device can present the example GUI 302 of FIG. 3 in a web browser. The GUI can include multiple screens and views. The user device can present any appropriate GUI for an enterprise software application.

In some examples, a user launches a web browser on the user device and then directs the web browser to an address associated with the enterprise software application. The web browser can then receive an authentication page from the enterprise software application and present the authentication page to the user.

After the user authenticates to the enterprise software application, e.g., by entering a username and password, the user can navigate to a desired page using the web browser and the GUI presented in the web browser. The web browser can store information as the user interacts with the GUI, e.g., a username for the user or an authentication token.

The user device receives one or more selected UI elements in response to user actions (404). For example, the user can enter text into a text entry UI element or push a button or select a menu item from a menu UI element. The UI elements can be identified, e.g., as elements within a Document Object Model (DOM) for the web browser displaying the GUI.

The user device, using a presentation tier security controller, checks the selected UI elements against a mapping between UI elements and security keys (406). For example, the mapping can be the mapping 218 of FIG. 2. The user device can find a security key for the selected UI elements and determine an authorization policy for the selected UI elements.

The security key can specify an authorization policy that is based on a role of the user. Checking the selected UI elements against the mapping can include comparing a user role of the user with one or more authorized roles specified by the authorization policy. The authorization policy can also specify conditions under which a user having the user role can view or edit information with the selected UI elements.

The user device, using the presentation tier security controller, authorizes user access based on checking the selected UI elements against the mapping (408). For example, the presentation tier security controller can supply an authorization policy for the selected UI elements to the GUI, and the GUI can render the selected UI elements based on the authorization policy, e.g., as described above with respect to FIGS. 2 and 3.

If the user is not authorized to view a UI element, the presentation tier security controller can provide a response so that the GUI does not render the UI element. If the user is authorized to view but not edit a UI element, the presentation tier security controller can provide a response so that the GUI renders the UI element in a read-only format, e.g., greyed-out or otherwise frozen from user editing. If the user is authorized to view and edit a UI element or a field of a UI element, the presentation tier security controller can provide a response so that the GUI renders the UI element in a format that the user can edit, e.g., as a text entry box or a menu.

Figure 5:
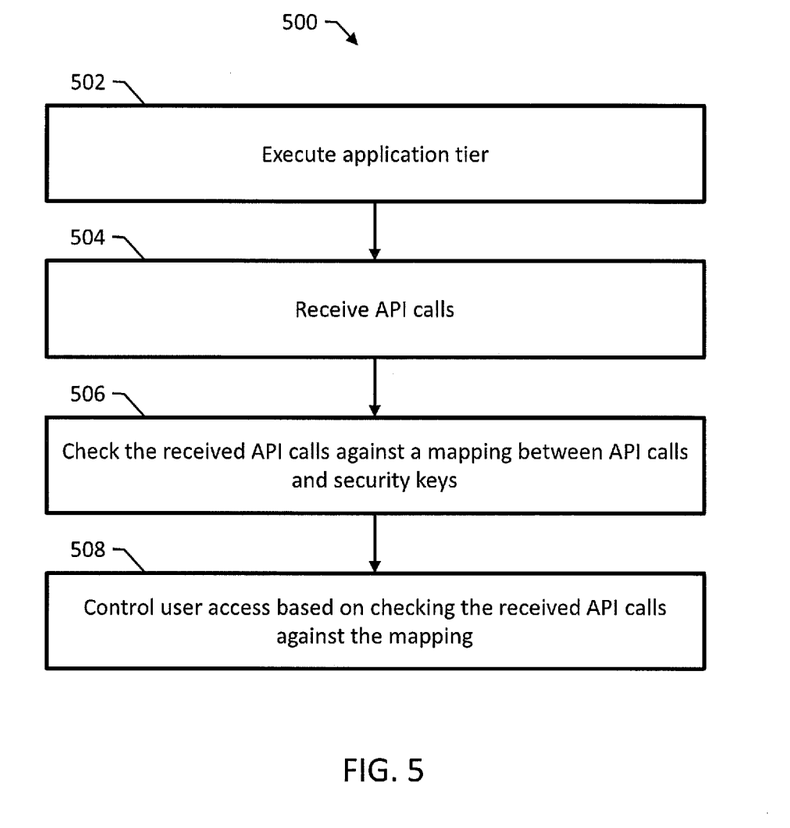
FIG. 5 is a flow diagram of an example method performed by an application tier security controller.

FIG. 5 is a flow diagram of an example method 500 performed by a server, e.g., the server 102 of FIG. 1. One or more non-transitory computer readable mediums can store instructions that, when executed by a system of one or more computers, cause the system to perform the method 500.

The server executes an application tier of an enterprise software application (502). The application tier can perform operations for various services, e.g., automated billing, customer relationship management, enterprise resource planning, human resource management, and the like. The application tier can execute or interact with a database storing various kinds of data supporting the enterprise software application.

The server receives one or more API calls (504) from a user device presenting a GUI for a presentation tier of the enterprise software application in a web browser. For example, the server can supply web pages the user device that collectively define the GUI. The GUI includes UI elements that an authenticated user can interact with and cause the web browser to send API calls to the server. The server receives the API calls back from the user device as the user engages the services provided by the enterprise software application.

The server checks the received API calls against a mapping between API calls and security keys (506). For example, the mapping can be the mapping 220 of FIG. 2. The server can find security keys for the received API calls, or individual attributes of the input/output payloads of the API calls, and can determine an authorization policy for the for the API calls or the individual attributes of the input/output payloads of the API calls.

The server authorizes user access based on checking the received API calls against the mapping (508). For example, the server can deny or allow access to data stored on the server. If the server determines that access should be denied, the server can return a denial message. If the server determines that access should be allowed, the server can return requested data. If the sever determines that further actions need to be taken to evaluate an authorization policy, the server can perform those actions, e.g., by requesting data from an external system.

Accordingly, while the methods, systems, and computer readable media have been described herein in reference to specific embodiments, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein.

Various combinations and sub-combinations of the structures and features described herein are contemplated and will be apparent to a skilled person having knowledge of this disclosure. Any of the various features and elements as disclosed herein may be combined with one or more other disclosed features and elements unless indicated to the contrary herein.

Correspondingly, the subject matter as hereinafter claimed is intended to be broadly construed and interpreted, as including all such variations, modifications and alternative embodiments, within its scope and including equivalents of the claims. It is understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method performed by a server comprising one or more computers, the method comprising:
   executing an application tier of an enterprise software application for receiving a plurality of Application Programming Interface (API) calls from a user device presenting a graphical user interface (GUI) for a presentation tier of the enterprise software application in a web browser, and for responding to the API calls; and executing an application tier security controller for checking the API calls against a mapping that maps each API call into a respective group with a respective user interface (UI) element of the GUI and a respective security key, and for authorizing user access to the application tier based on checking the API calls against the mapping;

wherein the GUI includes a controlled group of UI elements specified in the mapping and an uncontrolled group of UI elements not specified in the mapping;

wherein executing the application tier security controller comprises receiving an instruction to add a first UI element from the uncontrolled group to the controlled group and, in response, creating a group for the first UI element in the mapping.

2. The method of claim 1, wherein each security key specifies an authorization policy for both the UI element and the API call associated with the security key, and wherein checking the API calls against the mapping comprises comparing a user role of an authenticated user with one or more authorized roles specified by the authorization policy.

3. The method of claim 1, wherein creating the group for the first UI element comprises associating a first API call and a first security key with the first UI element.

4. The method of claim 1, wherein creating the group for the first UI element comprises creating the group without modifying software of the enterprise software application or without causing a system outage of the enterprise software application.

5. The method of claim 1, wherein checking the API calls against the mapping comprises checking the API calls against individual attributes of input and/or output payloads of the API calls.

6. The method of claim 1, wherein checking the API calls against the mapping comprises checking for conditional or unconditional restrictions specified in the mapping.

7. The method of claim 1, wherein checking the API calls against the mapping comprises consulting an external data source when specified by the mapping to successfully evaluate a security policy of the enterprise software application.

8. The method of claim 1, wherein executing the application tier security controller comprises storing, in a cache, an authorization policy, the mapping, and a plurality of keys specified in the mapping, and refreshing the cache in response to determining that the authorization policy or one of the keys has been changed.

9. A server comprising:
one or more processors;
one or more memories;
an application tier of an enterprise software application stored on the one or more memories executable by the one or more processors for receiving a plurality of Application Programming Interface (API) calls from a user device presenting a graphical user interface (GUI) for a presentation tier of the enterprise software application in a web browser, and for responding to the API calls; and
an application tier security controller stored on the one or more memories executable by the one or more processors for checking the API calls against a mapping that maps each API call into a respective group with a respective user interface (UI) element of the GUI and a respective security key, and for authorizing user access to the application tier based on checking the API calls against the mapping;

wherein the GUI includes a controlled group of UI elements specified in the mapping and an uncontrolled group of UI elements not specified in the mapping;

wherein executing the application tier security controller comprises receiving an instruction to add a first UI element from the uncontrolled group to the controlled group and, in response, creating a group for the first UI element in the mapping.

10. The server of claim 9, wherein each security key specifies an authorization policy for both the UI element and the API call associated with the security key, and wherein checking the API calls against the mapping comprises comparing a user role of an authenticated user with one or more authorized roles specified by the authorization policy.

11. The server of claim 9, wherein creating the group for the first UI element comprises associating a first API call and a first security key with the first UI element.

12. The server of claim 9, wherein creating the group for the first UI element comprises creating the group without modifying software of the enterprise software application or without causing a system outage of the enterprise software application.

13. The server of claim 9, wherein checking the API calls against the mapping comprises checking the API calls against individual attributes of input and/or output payloads of the API calls.

14. The server of claim 9, wherein checking the API calls against the mapping comprises checking for conditional or unconditional restrictions specified in the mapping.

15. The server of claim 9, wherein checking the API calls against the mapping comprises consulting an external data source when specified by the mapping to successfully evaluate a security policy of the enterprise software application.

16. The server of claim 9, wherein executing the application tier security controller comprises storing, in a cache, an authorization policy, the mapping, and a plurality of keys specified in the mapping, and refreshing the cache in response to determining that the authorization policy or one of the keys has been changed.

17. One or more non-transitory computer readable media storing instructions that, when executed by one or more processors, cause the one or more processors to perform operations comprising:
executing an application tier of an enterprise software application for receiving a plurality of Application Programming Interface (API) calls from a user device presenting a graphical user interface (GUI) for a presentation tier of the enterprise software application in a web browser, and for responding to the API calls; and
executing an application tier security controller for checking the API calls against a mapping that maps each API call into a respective group with a respective user interface (UI) element of the GUI and a respective security key, and for authorizing user access to the application tier based on checking the API calls against the mapping;
wherein the GUI includes a controlled group of UI elements specified in the mapping and an uncontrolled group of UI elements not specified in the mapping;
wherein executing the application tier security controller comprises receiving an instruction to add a first UI element from the uncontrolled group to the controlled group and, in response, creating a group for the first UI element in the mapping.

* * * * *

UNITED STATES PATENT AND TRADEMARK OFFICE
CERTIFICATE OF CORRECTION

PATENT NO. : 9,591,000 B2  
APPLICATION NO. : 14/745317  
DATED : March 7, 2017  
INVENTOR(S) : Shokhrin et al.

It is certified that error appears in the above-identified patent and that said Letters Patent is hereby corrected as shown below:

On the Title Page

Column 2, under Abstract, Line 8, delete "sever" and insert -- server --, therefor.

In the Specification

In Column 2, Line 38, delete "sever" and insert -- server --, therefor.

In Column 3, Line 17, delete "sever" and insert -- server --, therefor.

In Column 12, Line 29, delete "sever" and insert -- server --, therefor.

Signed and Sealed this
Twenty-ninth Day of August, 2017

Joseph Matal
*Performing the Functions and Duties of the*
*Under Secretary of Commerce for Intellectual Property and*
*Director of the United States Patent and Trademark Office*